United States Patent [19]

Sze

[11] 4,301,425

[45] Nov. 17, 1981

[54] XECL AVALANCHE DISCHARGE LASER EMPLOYING AR AS A DILUENT

[75] Inventor: Robert C. Sze, Santa Fe, N. Mex.

[73] Assignee: The United States of America as represented by the United States Department of Energy, Washington, D.C.

[21] Appl. No.: 83,508

[22] Filed: Oct. 10, 1979

[51] Int. Cl.[3] ............................................. H01S 3/22
[52] U.S. Cl. ............................................. 331/94.5 G
[58] Field of Search ................................. 331/94.5 G

[56] References Cited

PUBLICATIONS

"Intense Lasing in Discharge Excited Noble-Gas Monochlorides" by Sze et al., *Appl. Phys. Lett. 33 (5)*, Sep. 1, 1978, pp. 419–421.

*Primary Examiner*—William L. Sikes
*Assistant Examiner*—Léon Scott, Jr.
*Attorney, Agent, or Firm*—William W. Cochran; Paul D. Gaetjens; Richard G. Besha

[57] ABSTRACT

A XeCl avalanche discharge exciplex laser which uses a gaseous lasing starting mixture of: (0.2%–0.4% chlorine donor/2.5%–10% Xe/97.3%–89.6% Ar). The chlorine donor normally comprises HCl but can also comprise $CCl_4$ $BCl_3$. Use of Ar as a diluent gas reduces operating pressures over other rare gas halide lasers to near atmospheric pressure, increases output lasing power of the XeCl avalanche discharge laser by 30% to exceed KrF avalanche discharge lasing outputs, and is less expensive to operate.

4 Claims, 7 Drawing Figures

4,301,425

XECL AVALANCHE DISCHARGE LASER EMPLOYING AR AS A DILUENT

BACKGROUND OF THE INVENTION

1. Field of the Invention

The present invention pertains generally to lasers and more particularly to rare gas halide avalanche discharge exciplex lasers.

2. Description of the Background

Substantial output powers have been achieved in the ultraviolet spectral region by the rare gas halide lasers. When employed as avalanche discharge lasers, the KrF exciplex laser achieves large output powers per pulse which is useful in photochemical applications generally, and more specifically, for industrial chemistry to supply energy to specific reactions. Since the KrF avalanche discharge laser has an output wavelength of approximately 248 nm, it is useful in pumping a large number of dyes which have an absorption peak which falls in the 248 nm wavelength spectral region. These dyes can then be used as lasers since they fluoresce and produce coherent photons at various frequencies in the uv and visible spectral regions.

However, many dyes useful for photochemistry applications do not have absorption peaks within the output spectral wavelength of the KrF laser such as, for example, the xenon chloride (XeCl) laser, which has an output wavelength of 308 nanometers, falls within the peak absorption region of many uv dyes. Similarly, the KrF laser has demonstrated a static fill lifetime which is substantially shorter than the XeCl laser, which consequently limits the useful lifetime of the gaseous lasing medium of the KrF laser. Furthermore, to obtain optimum output powers from the KrF laser, high gaseous lasing medium pressures must be maintained within the laser cavity. These required high pressures which introduces other safety and operational problems. For example, the interaction cavity maintained under these high pressure must be both electrically neutral and nonreactive to the gaseous lasing medium. Suitable materials lack the required tensile strength to prevent leakage and warpage of the cavity and simultaneously insure durability over extended operational periods.

3. Statement of the Objects

It is therefore an object of the present invention to provide an improved XeCl avalanche discharge laser.

It is also an object of the present invention to provide an improved XeCl avalanche discharge laser for providing high output powers equivalent to or exceeding KrF avalanche discharge lasers.

Another object of the present invention is to provide an improved XeCl laser which operates near atmospheric pressure.

Another object of the present invention is to provide an improved XeCl laser which is durable in operation.

Another object of the present invention is to provide an improved XeCl laser which uses a substantial portion of Ar diluent gas.

Another object of the present invention is to provide an improved XeCl laser for producing 308 nm wavelength radiation for pumping uv dyes.

Other objects, advantages, and novel features of the present invention will become apparent to those skilled in the art upon examination of the following detailed description of a preferred embodiment of the invention and the accompanying drawings.

SUMMARY OF THE INVENTION

The present invention overcomes the disadvantages and limitations of the prior art by providing an improved xenon chloride (XeCl) avalanche discharge exciplex laser. This is achieved by utilizing a substantial portion of Ar as a diluent gas in the gaseous lasing starting mixture. Improvement of approximately 30% in lasing energy output is achieved at operating pressures of 20 psi. The XeCl laser of the present invention is operated in the same manner as conventional XeCl avalanche discharge exciplex lasers using a gaseous lasing starting mixture comprising essentially Xe gas, a chlorine donor, and a substantial portion of Ar diluent gas. Use of Ar as a diluent gas not only increases output power substantially while reducing operating pressures, but is also less expensive than conventional He diluent gas mixtures.

DETAILED DESCRIPTION OF THE PREFERRED EMBODIMENT OF THE INVENTION

FIGS. 1-4 illustrate lasing output energy versus gaseous lasing medium filling pressure for ArF, KrF, XeF, and KrCl avalanche discharge laser using He, Ne, and Ar as diluent gases. The results disclosed in FIGS. 1-4 were obtained from a cable-charged device of 120 cm active discharge length. The discharge width was approximately 0.6 cm and the electrode separation was 2 cm. The discharge is established utilizing uv preionization from the side of the electrodes. Energy stored in the cables is approximately 30 joules which is delivered to the discharge during the stable glow discharge time. Current rise time was measured to be approximately 25 nanoseconds. The voltage rise time was measured at approximately 0.33 KV/ms. The laser structure is described in more detail in Rev. Sci. Instr. 49, 772 (1978) by R. C. Sze and P. B. Scott, which is incorporated by reference herein.

FIGS. 1-4 clearly illustrate the poor performance of various rare gas halide avalanche discharge lasers utilizing Ar as a diluent gas. This performance of the rare gas halide lasers using Ar as a diluent gas was generally expected since diluent gas molecules having high molecular weight (such as Ar) tend to ionize and produce arcing in the discharge volume. This is thought generally to be caused from the lower ionization energies of the heavier rare gases. For these reasons and from the data clearly shown in FIGS. 1-4, use of Ar as a diluent gas in the XeCl avalanche discharge laser, in accordance with the preferred embodiment of the present invention, was not expected to produce favorable results.

Figure 1:
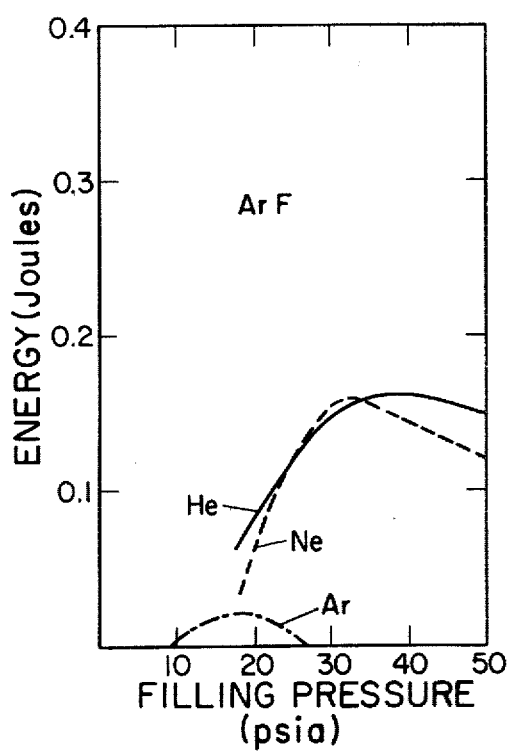
FIG. 1 is a graph of filling pressure versus output lasing energy for an ArF avalanche discharge laser using He, Ne, and Ar as diluent gases.
Figure 2:
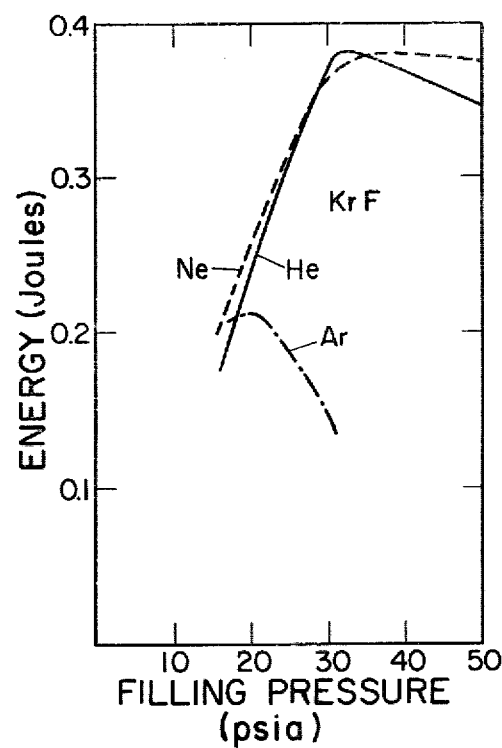
FIG. 2 is a graph of filling pressure versus output lasing energy in joules for a KrF avalanche discharge laser using He, Ne, and Ar as diluent gases.
Figure 3:
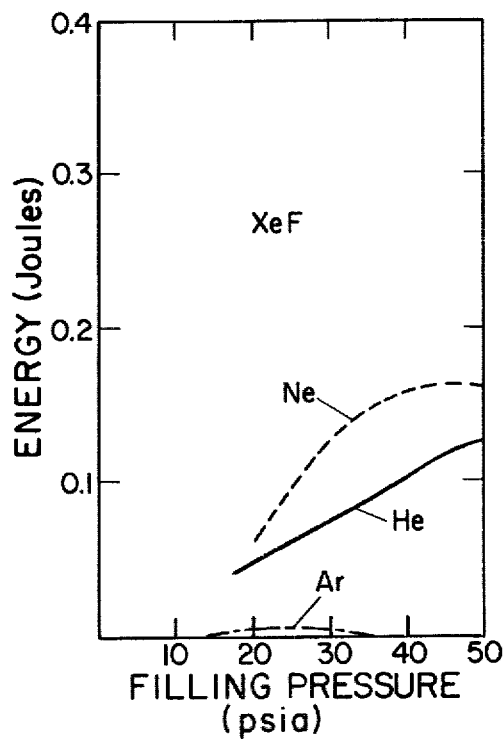
FIG. 3 is a graph of filling pressure versus output lasing energy in joules for a XeF laser using He, Ne, and Ar as diluent gases.
Figure 4:
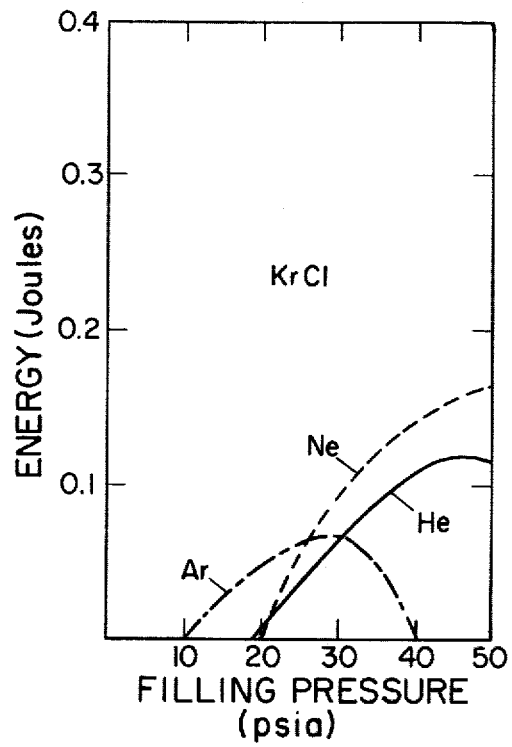
FIG. 4 is a graph of filling pressure versus output energy in joules for a KrCl avalanche discharge laser using He, Ne, and Ar as diluent gases.
Figure 5:
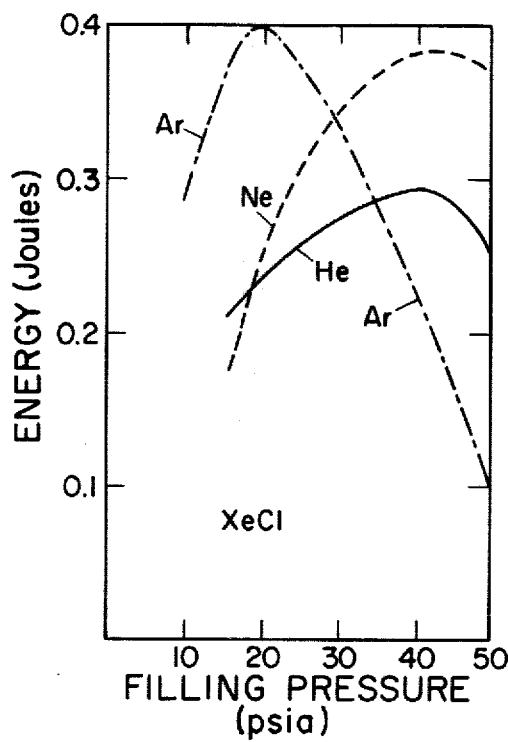
FIG. 5 is a graph of filling pressure versus output lasing energy in joules for a XeCl laser using He, Ne, and Ar as diluent gases.

As illustrated in FIG. 5, use of Ar as a diluent gas in the xenon chloride (XeCl) avalanche discharge laser produces output lasing energies exceeding the lasing output performance of the KrF laser. Moreover, the XeCl laser of the present invention utilizing Ar as a diluent gas has a output lasing energy peak at approximately 20 psia, i.e., very near atmospheric pressure, which greatly enhances the operational characteristics of the lasing device. As shown in FIG. 5, the lasing energy output achieved by using Ar as a diluent gas rather than He gas, is approximately 30%. A gaseous lasing starting mixture of approximately (0.2% HCl/5% Xe/94.8% diluent gas) was used to obtain the curves of FIG. 5. Of course, a range of percentages of gaseous lasing medium starting mixture can be used as follows: (0.2%–0.4% chlorine donor/2.5%–10% Xe/97.3%–89.6% Ar), wherein the chlorine donor can comprise any suitable molecule to provide chlorine to the reaction, such as $CCl_4$ or $BCl_3$, for example.

The laser device used in FIGS. 1-4 was also used to obtain the data of FIG. 5, to show comparison of output energy levels for the various rare gas halide lasers. The performance of the XeCl laser using Ar as a diluent gas, comprising the preferred embodiment of the invention, is expected to scale to higher output lasing energies in larger laser devices.

Additionally, the comparison data was taken back to back. First, the laser cavity was well passivated with the helium diluent gas mixture; data with the helium mixture was obtained; then, the cavity was evacuated and the neon or argon gas mixture was put into the cavity. In each case, the fractional percentages of the gas constituents were obtained for optimum operation with helium as a diluent.

Figure 6:
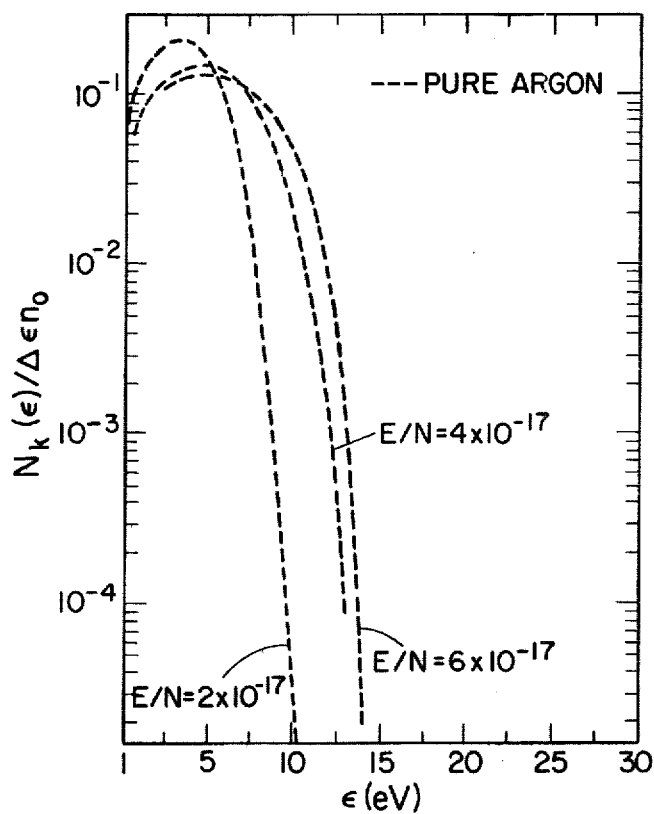
FIG. 6 is a graph of electron energy distribution as a function of electron energy for various E/N values for pure argon.

The output energy dependence of the XeCl laser in argon diluent as a function of pressure, illustrated in FIG. 5, can be explained in terms of the change in the electron energy distribution as a function of changing E/N, where E is the discharge voltage in the cavity and N is the number of gaseous lasing medium molecules. The parameter N is proportional to pressure at the gaseous lasing starting mixture. FIG. 6 shows the electron energy distribution as a function of energy in electron volts (eV) of the dissociated electrons from the argon molecule, for various values of E/N in pure argon. Since the lowest excited state that must be accessed to produce the XeCl exciplexes is the $^3P_1$ Xe resonance trapped level, there must be a substantial number density of electrons with energies of 8.43 eV. The sharply peaked pressure dependence illustrated in FIG. 5 at 20 psia of the XeCl laser in Ar diluent, is therefore associated with the rapidly decreasing density of electrons above 8 eV as E/N is lowered, due to increased filling pressure. This becomes more apparent when referring to FIG. 7.

Figure 7:
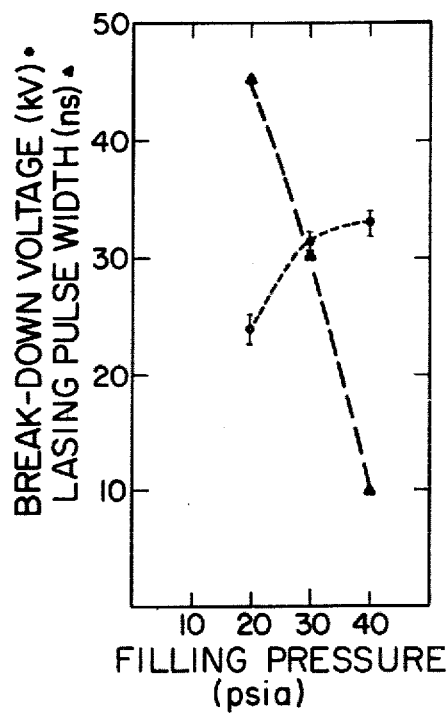
FIG. 7 is a graph of filling pressure versus breakdown voltage and lasing pulse width for a gaseous lasing mixture comprising essentially Xe gas, HCl and Ar diluent gas.

As shown in FIG. 7, the breakdown of voltage ceases to increase rapidly with filling pressure above 20 psia. As a result, E/N, which is equivalent to breakdown voltage of the gaseous lasing medium over the filling pressure, begins to decrease at 20 psia. Referring again to FIG. 6, electron energy and electron energy distribution fall off rapidly as E/N is decreased, so as to reduce the number of electrons above 8.43 eV, thereby decreasing output lasing energy of the XeCl laser using Ar as a diluent gas.

The present invention therefore provides an XeCl avalanche laser using Ar as a diluent gas which is capable of producing output energies equivalent to KrF avalanche discharge lasers. High output energies are achieved at pressures of approximately 20 psia rather than the much higher pressures required to achieve equivalent energies in other rare gas halide lasers, thereby enhancing operation of the lasing device of the present invention. Additionally, use of Ar as the diluent gas, which is the major constituent of the gaseous lasing starting mixture, greatly reduces cost of the mixture over either helium or neon. Moreover, the static fill lifetime of the XeCl laser is much greater than other rare gas halide lasers such as the KrF laser, thereby greatly increasing utility of the laser of the present invention in both laboratory and commercial applications.

The foregoing description of a preferred embodiment of the invention has been presented for the purposes of illustration and description and is not intended to be exhaustive or to limit the invention to the precise form disclosed. It was chosen and described in order to best explain the principles of the invention and practical application of these principles to thereby enable others skilled in the art to best utilize the invention in various embodiments and with various modifications as are suited to the particular use contemplated. It is intended that the scope of the invention be defined by the claims appended hereto and that subject matter disclosed herein shall not be precluded from being later claimed in the present application, a separate application, or, a continuation, continuation-in-part, or reissue application.

What is claimed is:

1. In a XeCl avalanche discharge exciplex laser, a gaseous lasing starting mixture comprising:
   essentially Xe gas;
   a chlorine donor;
   Ar comprising the primary portion of diluent gas.

2. The combination of claim 1 wherein said chlorine donor comprises HCl.

3. In a XeCl avalanche discharge exciplex laser, a gaseous lasing starting mixture comprising:
   0.2%–0.4% chlorine donor;
   2.5%–10% Xe;
   97.3–89.6% Ar diluent.

4. The combination of claim 3 wherein said chlorine donor comprises HCl.

* * * * *